(12) United States Patent
Lee et al.

(10) Patent No.: US 7,860,322 B2
(45) Date of Patent: Dec. 28, 2010

(54) DISPLAY DRIVING APPARATUS AND METHOD AND MEDIUM FOR IMPLEMENTING THE DISPLAY DRIVING METHOD

(75) Inventors: Sangjo Lee, Suwon-si (KR); Wooshik Kim, Yongin-si (KR); Jongseon Kim, Seongnam-si (KR); Shihwa Lee, Seoul (KR); Doohyun Kim, Seoul (KR); Bomyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1261 days.

(21) Appl. No.: 11/411,967

(22) Filed: Apr. 27, 2006

(65) Prior Publication Data
US 2006/0279654 A1     Dec. 14, 2006

(30) Foreign Application Priority Data
Jun. 4, 2005     (KR)     ...................... 10-2005-0048104

(51) Int. Cl.
*G06K 9/36*     (2006.01)
(52) U.S. Cl. ...................................................... 382/232
(58) Field of Classification Search ......... 382/232–253, 382/166; 375/240.01–240.29; 348/443–446, 348/474
See application file for complete search history.

(56) References Cited

U.S. PATENT DOCUMENTS

| | | | | |
|---|---|---|---|---|
| 4,597,005 A | * | 6/1986 | Baleshta et al. ............. | 348/472 |
| 5,517,333 A | * | 5/1996 | Tamura et al. .............. | 358/518 |
| 5,850,482 A | * | 12/1998 | Meany et al. ............... | 382/232 |
| 6,088,484 A | | 7/2000 | Mead | |
| 6,157,740 A | * | 12/2000 | Buerkle et al. .............. | 382/233 |

(Continued)

FOREIGN PATENT DOCUMENTS

EP     0811866     12/1997

(Continued)

OTHER PUBLICATIONS

Korean Office Action issued Oct. 26, 2006 in Korean Patent Application No. 10-2005-0048104.

(Continued)

*Primary Examiner*—Sherali Ishrat
(74) *Attorney, Agent, or Firm*—Staas & Halsey LLP

(57) ABSTRACT

A display driving apparatus and method using a display device, such as a liquid crystal display device, and a medium for implementing a method of display driving method are provided. The display driving apparatus includes: an encoding unit which compresses and encodes image data to be displayed by the display device; a memory which stores the encoded image data; a memory control unit which stores the encoded image data in the memory and reads the encoded image data from the memory; and a decoding unit which decodes the encoded image data read out from the memory to restore the image data. Input image data is compressed and encoded in units of blocks, and the encoded image data is stored in a memory. Thereafter, the encoded image data stored in the memory is decoded, and the decoded result is output to a display device. Thus, it is possible to reduce the size of a memory included in a display driving apparatus without deteriorating the quality of an image displayed.

41 Claims, 13 Drawing Sheets

U.S. PATENT DOCUMENTS

| | | | |
|---|---|---|---|
| 6,282,322 B1 * | 8/2001 | Rackett | 382/248 |
| 6,400,471 B1 * | 6/2002 | Kuo et al. | 358/468 |
| 6,900,845 B1 * | 5/2005 | Christopher et al. | 348/445 |
| 7,492,950 B2 * | 2/2009 | Suzuki et al. | 382/232 |
| 2004/0213348 A1 | 10/2004 | Kim et al. | |

FOREIGN PATENT DOCUMENTS

| | | |
|---|---|---|
| EP | 0912062 | 4/1999 |
| EP | 1091588 | 4/2001 |
| EP | 1289304 | 3/2003 |
| EP | 1434195 | 6/2004 |
| KR | 10-2001-0039192 | 5/2001 |
| WO | 01/10136 | 2/2001 |
| WO | 03/034392 | 4/2003 |

OTHER PUBLICATIONS

Re-Codable Video, Pereira et al., Proceedings of the International Conference on Image Processing (ICIP) Austin, Nov. 13-16, 1994, Los Alamitos, IEEE Comp. Soc. Press, US, vol. 2, Nov. 13, 1994, pp. 952-956.

Data Compression, Lelewer et al., ACM Computing Surveys, ACM, New York, NY, US, vol. 19, No. 3, Sep. 1, 1987 pp. 261-296.

Combined Image Decompression and Display Driving Using Wavelet-Based Multiple Line Addressing, Lawrence et al., 2001 SID International Symposium Jun. 3-8, 2001, San Jose Convention Center, CA, vol. XXXII, Jun. 3, 2001, pp. 98-101.

Buffer Control Technique for Video Coding, Calvagno et al., Advanced Image and Video Communications and Storage Technologies, Amsterdam, Mar. 20-23, 1995, SPIE vol. 2451, Jan. 1, 1995, pp. 31-40.

European Search Report dated Dec. 22, 2008.

* cited by examiner

FIG. 10A

| O | O | O | O | O | O | O | O |

FIG. 10B

| X | X | X | X | O | O | O | O |

FIG. 10C

| X | X | X | X | X | X | X | X |

FIG. 10D

| 10 | 4 | -3 | 2 | O | O | O | O |

FIG. 10E

| 6 | 4 | -3 | 2 | 0 | -1 | 1 | 0 |

FIG. 10F

| 6 | 4 | -3 | 2 | 0 | 0 | 0 | 0 |

FIG. 11A

| 8 | -4 | -3 | 2 | 0 | 0 | 0 | 0 |

FIG. 11B

| 6 | -4 | -3 | 2 | 0 | 0 | 0 | 0 |

DISPLAY DRIVING APPARATUS AND METHOD AND MEDIUM FOR IMPLEMENTING THE DISPLAY DRIVING METHOD

CROSS-REFERENCE TO RELATED APPLICATIONS

This application claims the benefit of Korean Patent Application No. 10-2005-0048104, filed on Jun. 4, 2005, in the Korean Intellectual Property Office, the disclosure of which is incorporated herein in its entirety by reference.

BACKGROUND OF THE INVENTION

1. Field of the Invention

The present invention relates to a display driving apparatus and method, and more particularly, to a display driving apparatus and method allowing a reduction in the size of a memory by reducing the size of image data stored in the memory. The present invention also relates to a medium for implementing a display driving method, and more particularly, to a medium for implementing a display driving method allowing a reduction in the size of a memory by reducing the size of image data stored in the memory.

2. Description of the Related Art

In general, display devices, such as liquid crystal display (LCD) and organic electro-luminescence (EL) devices, receive image data from display driving apparatuses equipped with memories and display images based on the received image data. A plurality of image data to be displayed are sequentially input to and stored in a memory.

As the size of image data that can be displayed by display devices increases and the demand for high resolution and multi-gray scale increases, the size of memories for storing image data increases.

However, the increase in the size of memories may result in an increase in the sizes and manufacturing costs of display driving apparatuses.

SUMMARY OF THE INVENTION

Additional aspects, features and/or advantages of the invention will be set forth in part in the description which follows and, in part, will be apparent from the description, or may be learned by practice of the invention.

The present invention provides a display driving apparatus and method, and a medium for implementing a method for display driving. When the method is used, the required size of a memory can be reduced by compressing and then encoding input image data to reduce the size of the input image data, storing the encoded input image data in the memory, decoding the image data stored in the memory, and outputting the decoded image data to a display device.

According to an aspect of the present invention, there is provided a display driving apparatus which drives a display device for displaying images. The display driving apparatus includes: an encoding unit which compresses and encodes image data to be displayed by the display device; a memory which stores the encoded image data; a memory control unit which stores the encoded image data in the memory and reads the encoded image data from the memory; and a decoding unit which decodes the encoded image data read out from the memory to restore the image data.

The encoding unit may encode the image data in units of lines.

The encoding unit may encode the image data in units of 8×1 blocks.

The encoding unit may encode the image data so that the image data can be compressed to be no larger than a predetermined size.

The encoding unit may include: a quantizer which performs a quantization operation on the image data using a number of bits allocated for quantization; and a size adjuster which reduces the number of bits allocated for quantization if the size of the encoded image data is larger than the predetermined size.

The size adjuster may increase the number of bits allocated for quantization if the size of the encoded image data is smaller than the predetermined size.

The size adjuster may compare the size of the encoded image data with the predetermined size in units of lines of an image that can be displayed by the display device and adjust the number of bits allocated for quantization based on the comparison results.

The encoding unit may includes a Hadamard converter which performs a Hadamard conversion operation on the image data.

According to another aspect of the present invention, there is provided a display driving apparatus which drives a display device for displaying images. The display driving apparatus includes: an encoding unit which encodes image data to be displayed by the display device in units of lines so that the image data can be compressed to be no larger than a predetermined size; a memory which stores the encoded image data; a memory control unit which stores the encoded image data in the memory and reads the encoded image data from the memory; and a decoding unit which decodes the encoded image data read out from the memory to restore the image data.

The encoding unit may include: a first color converter which color-converts RGB data to be displayed by the display device in units of 8×1 blocks in order to remove color redundancy from the RGB data; a predictor which performs an intraframe prediction encoding operation on the color-converted data; a Hadamard converter which performs a Hadamard conversion operation on the intraframe-prediction-encoded data; a quantizer which performs a quantization operation on the Hadamard-converted data using a number of bits allocated for quantization; a lossless encoder which performs a lossless encoding operation on the quantized data; and a size adjuster which reduces the number of bits allocated for quantization if the size of the losslessly encoded image data is larger than the predetermined size.

The predictor may perform the intraframe prediction encoding operation on the color-converted data in a vertical direction.

The predictor may include: an inverse Hadamard converter which performs an inverse Hadamard conversion operation on the quantized data; an inverse quantizer which performs an inverse quantization operation on the inversely Hadamard-converted data; a prediction decoder which performs an intraframe prediction decoding operation on the inversely quantized data; a prediction memory which stores the intraframe-prediction-decoded data in units of lines; and a prediction executioner which performs an intraframe prediction encoding operation on the color-converted data using the data stored in the prediction memory.

The quantizer may perform a quantization operation on the Hadamard-converted data using a dead zone approach.

The lossless encoder may include: a mode determiner which chooses Mode 0 if all of a plurality of pixel values of quantized 8×1 block data are 0, chooses Mode 1 if only the last 4 pixel values of the quantized 8×1 block data are 0, and chooses Mode 2 if none of the pixel values of the quantized 8×1 block data are 0; a flag determiner which sets a flag for the quantized 8×1 block data to a value of 1 if all of the pixel values of the quantized 8×1 block data have an absolute value of 7 or less and sets the flag for the quantized 8×1 block data to a value of 0 otherwise; and a Huffman coder which performs a Huffman coding operation on the quantized 8×1 block data using the mode determined by the mode determiner and the flag value determined by the flag determiner.

The size adjuster may increase the number of bits allocated for quantization if the size of the losslessly encoded image data is less than the predetermined size.

If the size adjuster changes the number of bits allocated for quantization, the quantizer may perform a quantization operation on the Hadamard-converted data using the changed number of bits allocated for quantization.

The decoder may include: a lossless decoder which performs a lossless decoding operation on the encoded image data read out from the memory; an inverse Hadamard converter which performs an inverse Hadamard conversion operation on the losslessly decoded data; an inverse quantizer which performs an inverse quantization operation on the inversely Hadamard-converted data; a prediction decoder which performs an intraframe prediction decoding operation on the inversely quantized data; and a second color converter which color-converts the intraframe-prediction-decoded data into RGB data.

According to another aspect of the present invention, there is provided a display driving method of driving a display device for displaying images. The display driving method includes: compressing and encoding image data to be displayed by the display device; storing the encoded image data in a memory; and reading the encoded image data from the memory and decoding the encoded image data read out from the memory to restore the image data.

The encoding may include encoding the image data in units of lines.

The encoding may include encoding the image data in units of 8×1 blocks.

The encoding may include encoding the image data so that the image data can be compressed to be no larger than a predetermined size.

The encoding may include: performing a quantization operation on the image data using a number of bits allocated for quantization; and reducing the number of bits allocated for quantization if the size of the encoded image data is larger than the predetermined size.

The encoding may include: performing a quantization operation on the image data using the number of bits allocated for quantization; and increasing the number of bits allocated for quantization if the size of the encoded image data is smaller than the predetermined size and performing the quantization operation again on the image data using the increased number of bits allocated for quantization.

The display driving method may also include comparing the size of the encoded image data with the predetermined size in units of lines of an image that can be displayed by the display device and adjusting the number of bits allocated for quantization based on the comparison results.

The encoding may include performing a Hadamard conversion operation on the image data.

According to another aspect of the present invention, there is provided a display driving method of driving a display device for displaying images. The display driving method includes: encoding image data to be displayed by the display device in units of lines so that the image data can be compressed to be no larger than a predetermined size; storing the encoded image data in a memory; and reading the encoded image data from the memory and decoding the encoded image data read out from the memory to restore the image data.

The encoding may include: color-converting RGB data to be displayed by the display device in units of 8×1 blocks in order to remove color redundancy from the RGB data; performing an intraframe prediction encoding operation on the color-converted data; performing a Hadamard conversion operation on the intraframe-prediction-encoded data; performing a quantization operation on the Hadamard-converted data using a number of bits allocated for quantization; performing a lossless encoding operation on the quantized data; and reducing the number of bits allocated for quantization if the size of the losslessly encoded image data is larger than the predetermined size and performing the quantization operation and the lossless encoding operation again using the reduced number of bits allocated for quantization.

The performing of the intraframe prediction encoding operation may include performing the intraframe prediction encoding operation on the color-converted data in a vertical direction.

The performing of the intraframe prediction encoding operation may include: performing the intraframe prediction encoding operation on the color-converted data in a vertical direction, a leftward diagonal line direction, and a rightward diagonal line direction; and choosing the intraframe-prediction-encoded result that minimizes spatial redundancy.

The performing of the intraframe prediction encoding operation may include: performing an inverse Hadamard conversion operation on the quantized data; performing an inverse quantization operation on the inversely Hadamard-converted data; performing an intraframe prediction decoding operation on the inversely quantized data; storing the intraframe-prediction-decoded data in a memory in units of lines; and performing an intraframe prediction encoding operation on the color-converted data using the data stored in the memory.

The performing of the quantization operation may include performing the quantization operation on the Hadamard-converted data using a dead zone approach.

The performing of the lossless encoding operation may include: choosing Mode 0 if all of a plurality of pixel values of quantized 8×1 block data are 0, choosing Mode 1 if only the last 4 pixel values of the quantized 8×1 block data are 0, and choosing Mode 2 if none of the pixel values of the quantized 8×1 block data are 0; setting a flag for the quantized 8×1 block data to a value of 1 if all of the pixel values of the quantized 8×1 block data have an absolute value of 7 or less and setting the flag for the quantized 8×1 block data to a value of 0 otherwise; and performing a Huffman coding operation on the quantized 8×1 block data using the mode determined by the determined mode and the determined flag value.

The decoding may include: performing a lossless decoding operation on the encoded image data read out from the memory; performing an inverse Hadamard conversion operation on the losslessly decoded data; performing an inverse quantization operation on the inversely Hadamard-converted data; performing an intraframe prediction decoding operation on the inversely quantized data; and color-converting the intraframe-prediction-decoded data into RGB data.

According to another aspect of the present invention, there is provided a computer-readable recording medium storing a computer program for executing display driving method.

According to another aspect of the present invention, there is provided at least one computer readable medium storing instructions that control at least one processor to perform a display driving method of driving a display device for displaying images, the display driving method including compressing and encoding image data to be displayed by the display device; storing the encoded image data in a memory; and reading the encoded image data from the memory and decoding the encoded image data read out from the memory to restore the image data.

According to another aspect of the present invention, there is provided at least one computer readable medium storing instructions that control at least one processor to perform a display driving method of driving a display device for displaying images, the display driving method including: encoding image data to be displayed by the display device in units of lines so that the image data can be compressed to be no larger than a predetermined size; storing the encoded image data in a memory; and reading the encoded image data from the memory and decoding the encoded image data read out from the memory to restore the image data.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 10A through 10F are diagrams explaining the operations of a mode determination unit (mode determiner) and a flag determination unit (flag determiner) of FIG. 8;

FIGS. 11A and 11B are diagrams for explaining a lossless encoding method performed by a Huffman coder of FIG. 8;

DETAILED DESCRIPTION OF THE PREFERRED EMBODIMENTS

Figure 1:
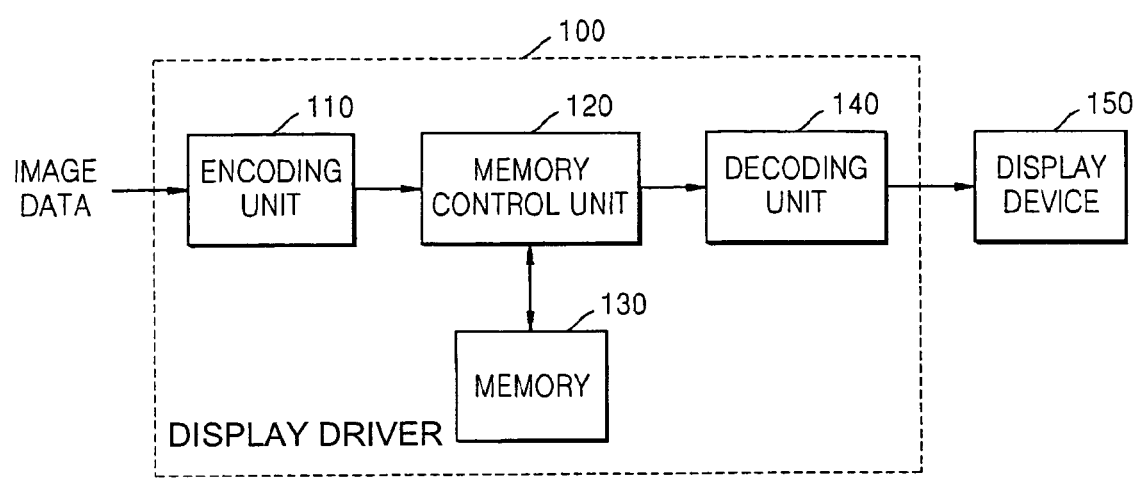
FIG. 1 is a block diagram of a display driving apparatus (display driver) according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 12:
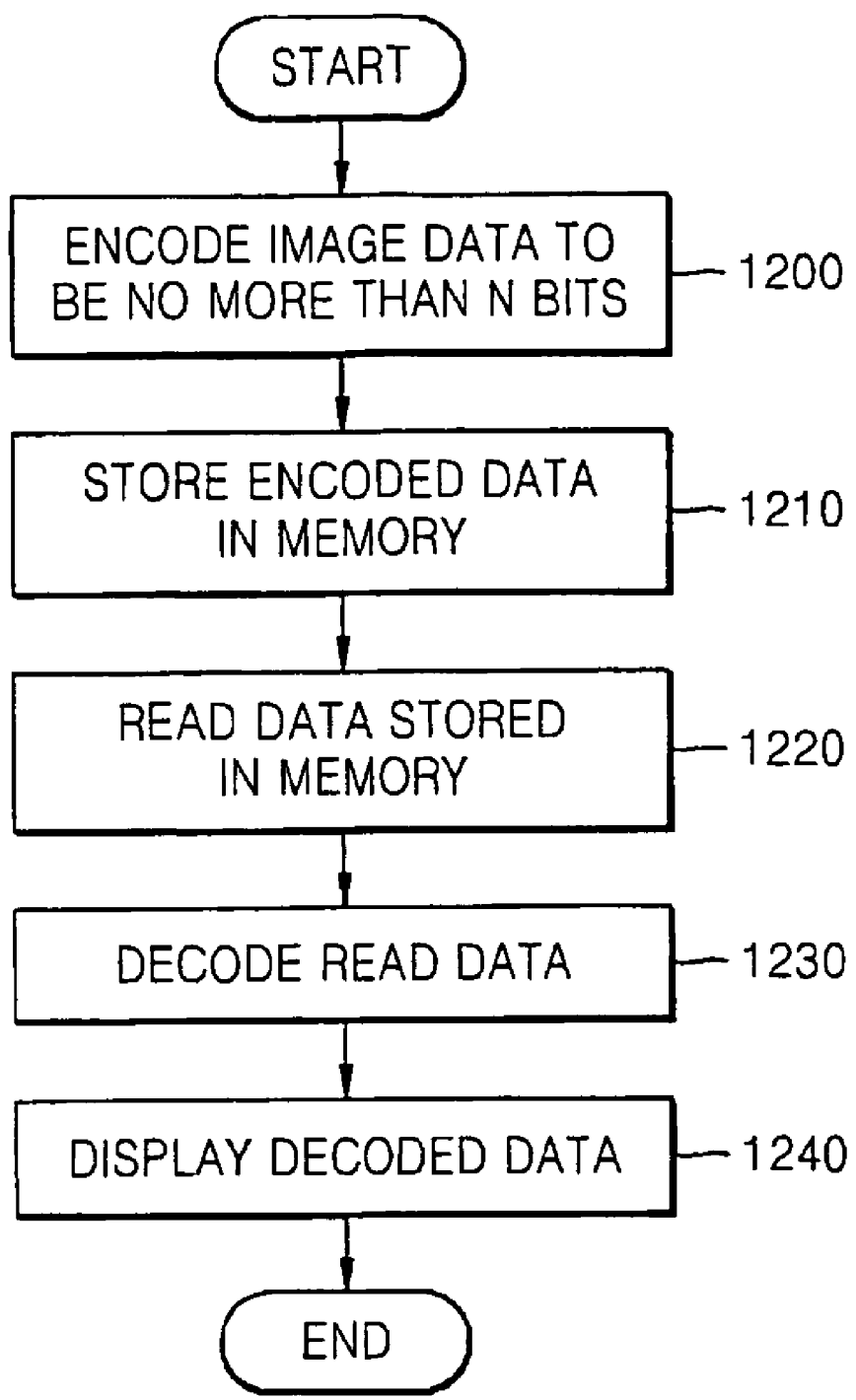
FIG. 12 is a flowchart illustrating a display driving method according to an exemplary embodiment of the present invention.

FIG. 1 is a block diagram of a display driving apparatus (display driver) 100 according to an exemplary embodiment of the present invention. Referring to FIG. 1, the display driving apparatus 100 includes an encoding unit 110, a memory control unit 120, a memory 130, and a decoding unit 140. FIG. 12 is a flowchart illustrating a display driving method according to an exemplary embodiment of the present invention. The operation of the display driving apparatus 100 will now be described in detail with reference to FIGS. 1 and 12.

Referring to FIGS. 1 and 12, in operation 1200, the encoding unit 110 receives image data to be displayed by a display device 150 in units of pixels and encodes the received image data so that the received image data is compressed to no more than N bits. Here, N is an integer determined in advance according to the size of the memory 130. For example, if the memory 130 can store up to M bits, N may be set to about 80% of M. The encoding unit 110 may convert the received image data into a plurality of blocks and may compress and encode the received image data in units of the blocks. Since image data is received by the display driving apparatus 100 in units of lines, the encoding unit 110 may sequentially convert the lines of the received image data into a plurality of blocks, thereby processing the received image data in real time.

In operation 1210, the memory control unit 120 stores the encoded image data. In operation 1220, after the storing of the encoded image data is complete, the memory control unit 120 reads the encoded image data from the memory 130.

In operation 1230, the decoding unit 140 receives the encoded image data read out from the memory 120, decodes the encoded image data to be displayable by the display device 150 by performing a decoding operation, which is an inverse operation of the operation performed in operation 1200 by the encoding unit 110, on the encoded image data and outputs the decoded image data to the display unit 150. In operation 1240, the display device 150 displays the decoded image data.

The operation of the encoding unit 110 will now be described in further detail with reference to FIGS. 2 and 13.

Figure 2:
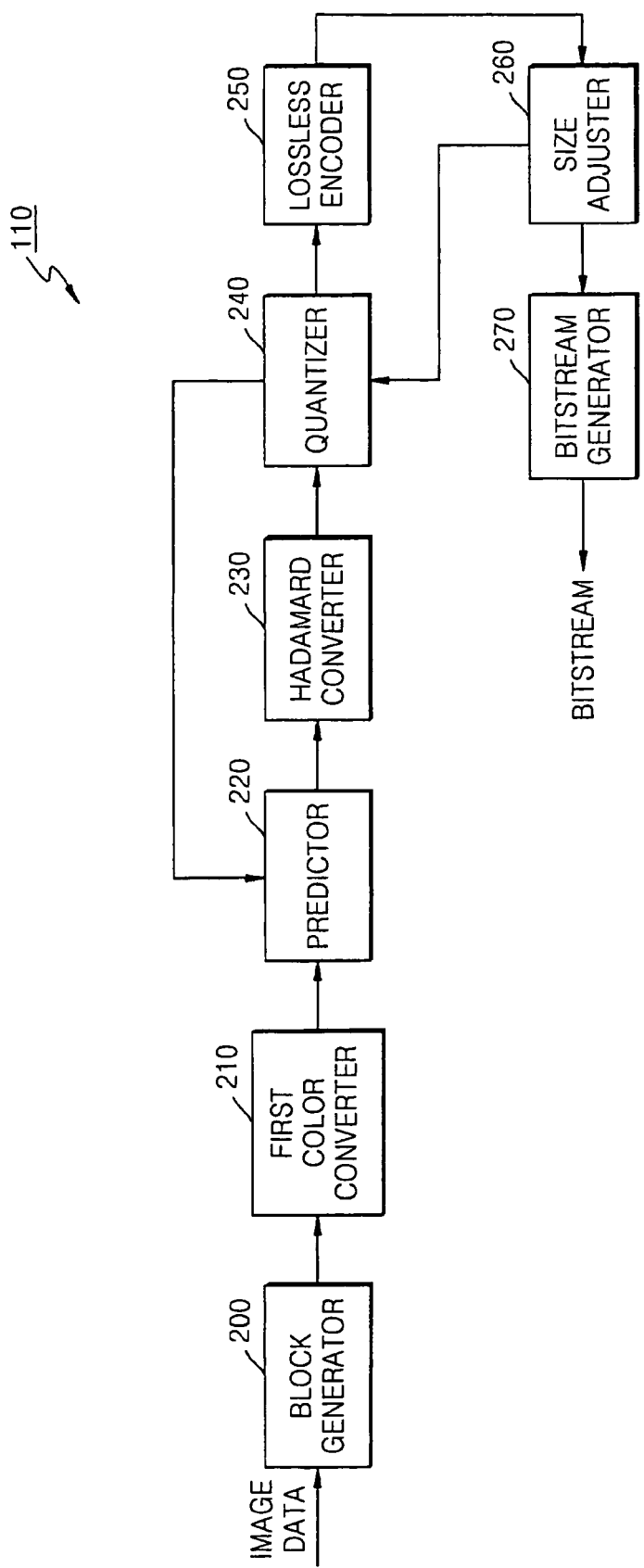
FIG. 2 is a detailed block diagram of an encoding unit of FIG. 1.

FIG. 2 is a detailed block diagram of the encoding unit 110 of FIG. 1. Referring to FIG. 2, the encoding unit 110 includes a block generator 200, a first color converter 210, a predictor 220, a Hadamard converter 230, a quantizer 240, a lossless encoder 250, a size adjuster 260, and a bitstream generator 270.

Figure 3:
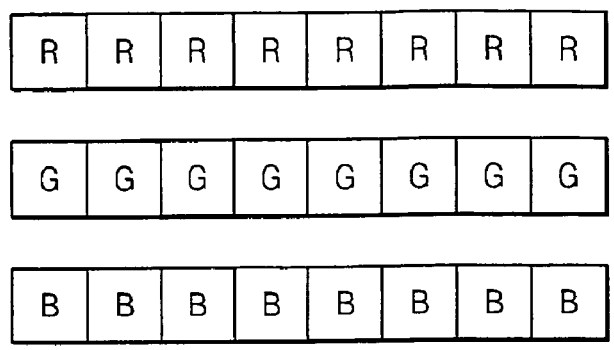
FIG. 3 is a diagram for explaining a method of converting RGB image data into a plurality of 8×1 blocks.
Figure 13:
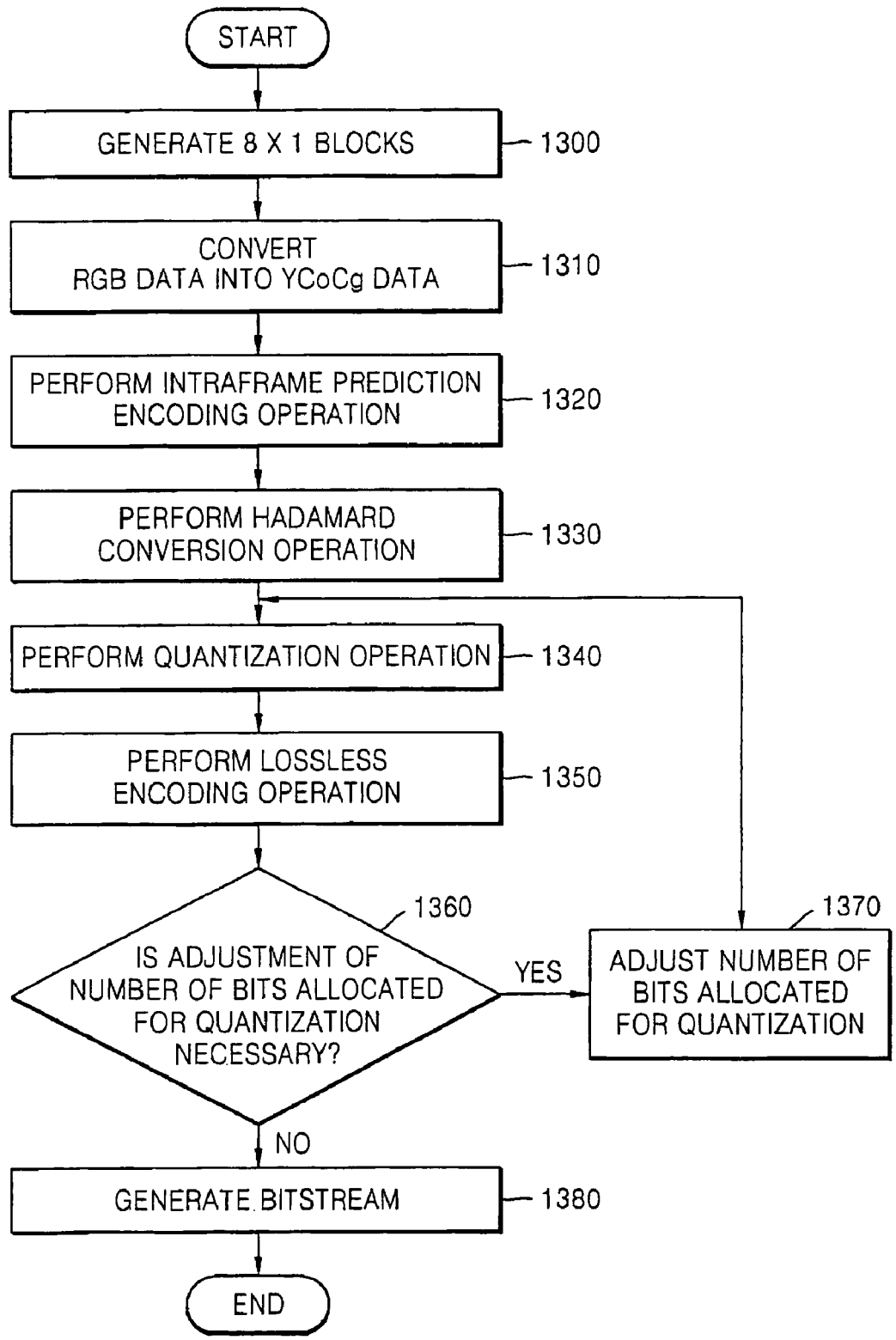
FIG. 13 is a detailed flowchart illustrating operation 1200 of FIG. 12.

FIG. 13 is a flowchart illustrating the operation of the encoding unit 110 of FIG. 1. Referring to FIGS. 2 and 13, in operation 1300, the block generator 200 converts received image data into a plurality of 8×1 blocks. FIG. 3 is a diagram for explaining a method of converting RGB (red, green, and blue) image data into a plurality of 8×1 blocks performed by the block generator 200. The block generator 200 converts each of R, G, and B data of input image data into a plurality of 8×1 blocks as illustrated in FIG. 3.

In operation 1310, the first color converter 210 converts the 8×1 block data into which the received image data is converted into YCoCg (luminance, offset orange, offset green) data through matrix computation as indicated in Equation (1), thereby removing color redundancy from the received image data:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix}. \quad (1)$$

In operation 1320, the predictor 220 performs an intraframe prediction encoding operation on the YCoCg data, thereby removing spatial redundancy from the received image data.

In operation 1330, the Hadamard converter 230 performs a Hadamard conversion operation on the intraframe-prediction-encoded data through matrix computation as indicated in Equation (2). The Hadamard conversion operation is carried out in order to remove inter-pixel redundancy from the 8×1 block data. The Hadamard converter 230 may carry out a discrete cosine transform (DCT) operation or an integer DCT operation, instead of the Hadamard conversion operation, to remove inter-pixel redundancy from the 8×1 block data. However, the Hadamard conversion operation is less complicated than the DCT operation and the integer DCT operation and is thus more suitable for processing image data in real time than the DCT operation and the integer DCT operation.

$$\begin{bmatrix} C_0 \\ C_1 \\ C_2 \\ C_3 \\ C_4 \\ C_5 \\ C_6 \\ C_7 \end{bmatrix} = \begin{bmatrix} 1 & 1 & 1 & 1 & 1 & 1 & 1 & 1 \\ 1 & 1 & 1 & 1 & -1 & -1 & -1 & -1 \\ 1 & 1 & -1 & -1 & -1 & -1 & 1 & 1 \\ 1 & 1 & -1 & -1 & 1 & 1 & -1 & -1 \\ 1 & -1 & -1 & 1 & 1 & -1 & -1 & 1 \\ 1 & -1 & -1 & 1 & -1 & 1 & 1 & -1 \\ 1 & -1 & 1 & -1 & -1 & 1 & -1 & 1 \\ 1 & -1 & 1 & -1 & 1 & -1 & 1 & -1 \end{bmatrix} \begin{bmatrix} P_0 \\ P_1 \\ P_2 \\ P_3 \\ P_4 \\ P_5 \\ P_6 \\ P_7 \end{bmatrix} \quad (2)$$

wherein $P_0$, $P_1$, $P_2$, $P_3$, $P_4$, $P_5$, $P_6$, and $P_7$ are pixel values included in an 8×1 block, and $C_0$, $C_1$, $C_2$, $C_3$, $C_4$, $C_5$, $C_6$, and $C_7$ are pixel values obtained by performing the Hadamard conversion operation on the pixel values $P_0$, $P_1$, $P_2$, $P_3$, $P_4$, $P_5$, $P_6$, and $P_7$.

Figure 7:
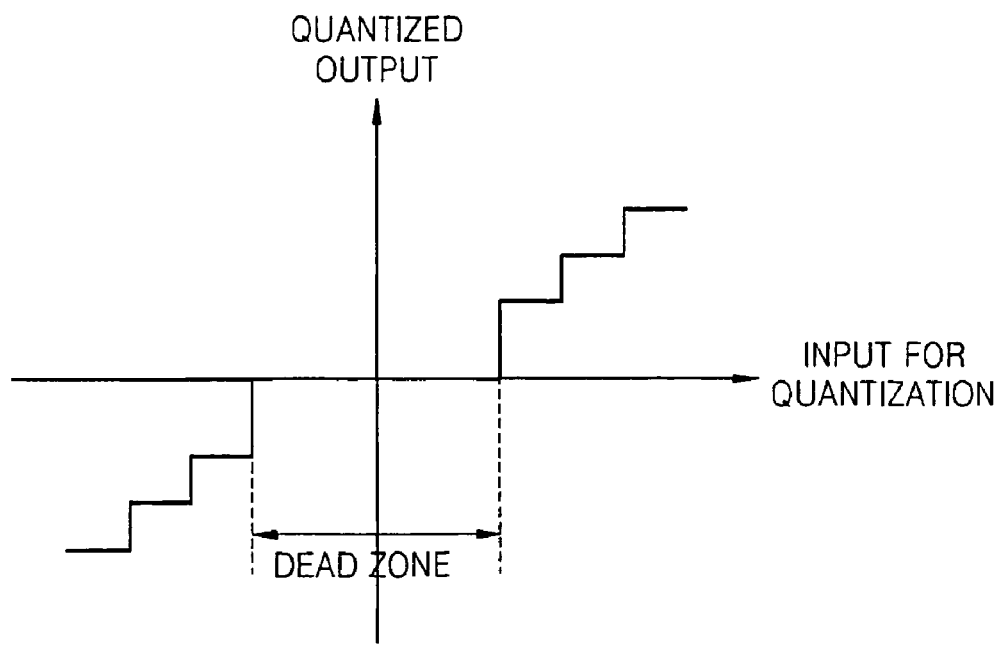
FIG. 7 is a graph for explaining a dead-zone quantization method.

In operation 1340, the quantizer 240 performs a quantization operation on the Hadamard-converted image data using a number of bits allocated for quantization using, for example, a dead zone quantization method as illustrated in FIG. 7. Referring to FIG. 7, in the dead zone quantization method, small input values which are classified as belonging to a dead zone are quantized to 0, thereby increasing the number of 0s and enhancing the efficiency of lossless encoding performed using, for example, a zero run length encoding method.

An intraframe prediction encoding method performed by the predictor 220 of FIG. 2 will now be described in further detail with reference to FIGS. 4A through 4C.

Figure 4A:
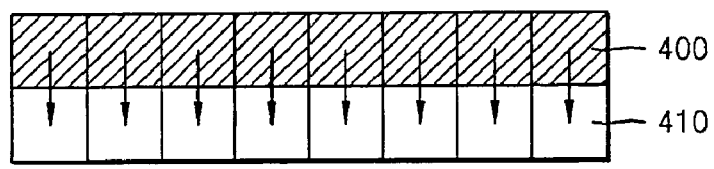
FIGS. 4A through 4C are diagrams for explaining examples of an intraframe prediction encoding method according to an exemplary embodiment of the present invention.

FIG. 4A illustrates an example of the intraframe prediction encoding method performed by the predictor 220 of FIG. 2. Referring to FIG. 4A, pixels belonging to a line 410 are intraframe-prediction-encoded using respective corresponding pixels belonging to a line 400.

Figure 4B:
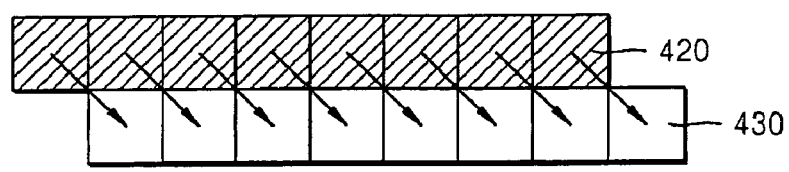

FIG. 4B illustrates another example of the intraframe prediction encoding method performed by the predictor 220 of FIG. 2. Referring to FIG. 4B, pixels belonging to a line 430 are intraframe-prediction-encoded using their respective upper left pixels belonging to a line 420.

Figure 4C:
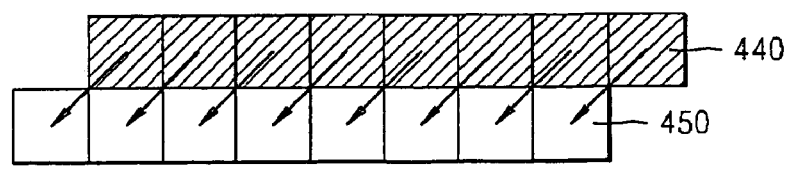

FIG. 4C illustrates another example of the intraframe prediction encoding method performed by the predictor 220 of FIG. 2. Referring to FIG. 4C, pixels belonging to a line 450 are intraframe-prediction-encoded using their respective upper right pixels belonging to a line 440.

The predictor 220 may perform one of the prediction encoding methods as illustrated in FIGS. 4A, 4B, and 4C. Alternatively, the predictor 220 may perform all of the prediction encoding methods as illustrated in FIGS. 4A, 4B, and 4C and output the intraframe-prediction-encoded result with the highest encoding efficiency. In this case, information regarding the prediction encoding method used to produce the intraframe-prediction-encoded result output by the predictor 220 must be encoded and then provided to the decoding unit 140.

Figure 5:
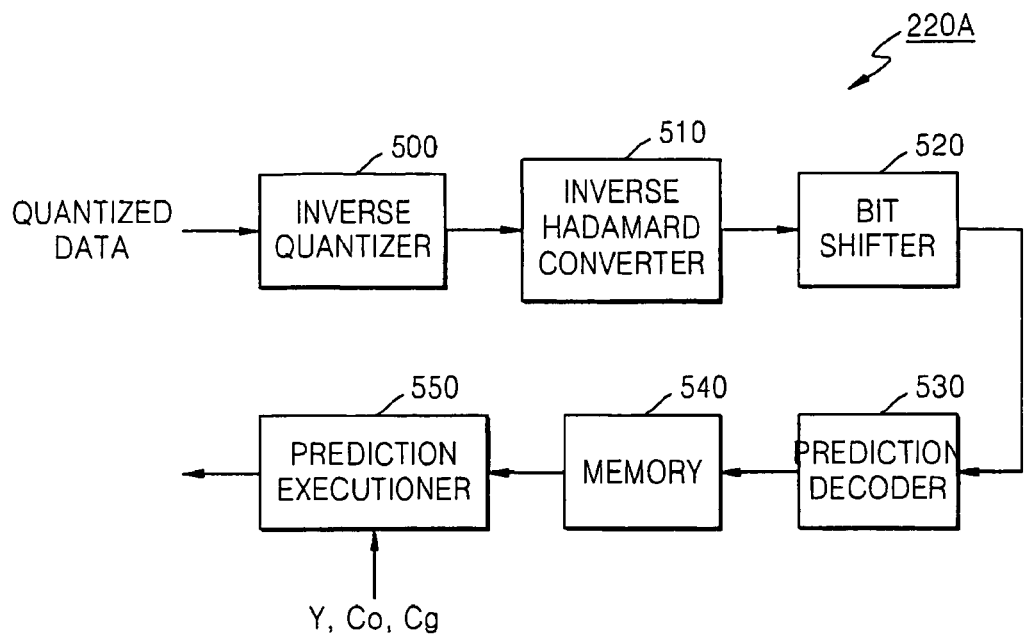
FIG. 5 is a detailed block diagram of an example of a predictor of FIG. 2.

FIG. 5 is a detailed block diagram of a predictor 220A, which is an example of the predictor 220 of FIG. 2. Referring to FIG. 5, the predictor 220A includes an inverse quantizer 500, an inverse Hadamard converter 510, a bit shifter 520, a prediction decoder 530, a memory 540, and a prediction executioner 550. The inverse quantizer 500 performs an inverse quantization operation on the quantized 8×1 block data received from the quantizer 240 of FIG. 2. The inverse Hadamard converter 510 performs an inverse Hadamard conversion operation on the inversely quantized data. The bit shifter 520 converts the inversely Hadamard-converted data into data with as many bits as data obtained through intraframe prediction encoding by shifting a plurality of bits of the inversely Hadamard-converted data. For example, if the predictor 220 of FIG. 2 converts data having 6 bits per pixel into data having 7 bits per pixel through prediction encoding, the bit shifter 520 converts the inversely Hadamard-converted data into data having 7 bits per pixel.

The prediction decoder 530 restores data yet to be intraframe-prediction-encoded from the data output by the bit shifter 520 by performing an intraframe prediction decoding operation, which is an inverse operation of an intraframe prediction encoding operation, on the data output by the bit shifter 520 and stores the restored data in the memory 540. For example, the prediction decoder 530 may receive data having 7 bits per pixel, decode the received data into data having 6 bits per pixel, and output the decoded result.

The data stored in the memory 540 corresponds to a line adjacent to and above a line corresponding to the YCoCg data received from the first color converter 210 of FIG. 2. The prediction executioner 550 performs an intraframe prediction encoding operation on the YCoCg data using the data stored in the memory 540.

Figure 6:
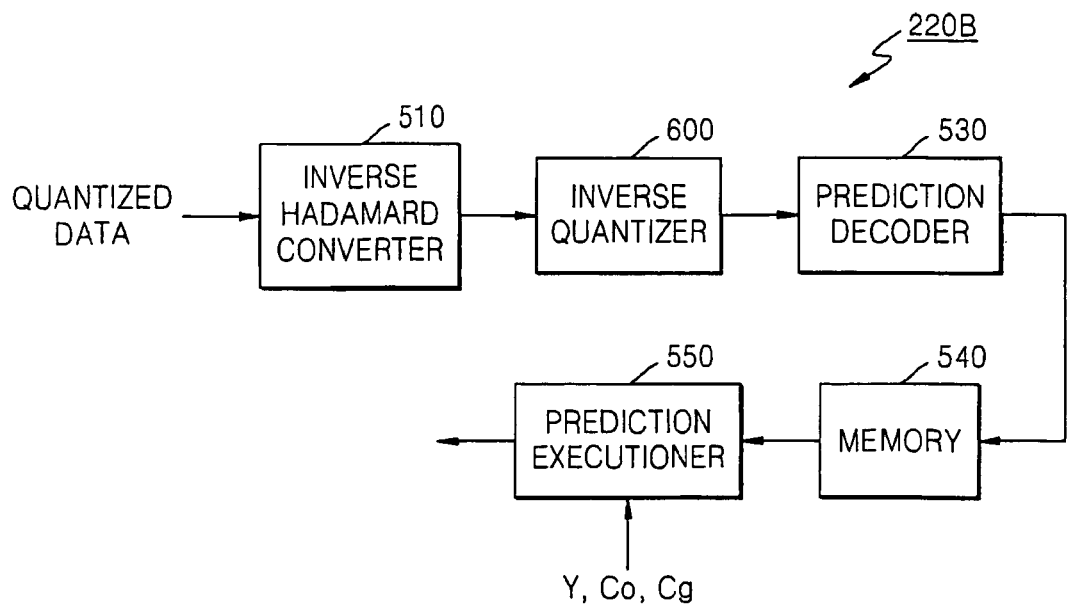
FIG. 6 is a detailed block diagram of another example of the predictor of FIG. 2.

FIG. 6 is a detailed block diagram of a predictor 220B, which is another example of the predictor 220 of FIG. 2. Referring to FIG. 6, the predictor 220B includes an inverse Hadamard converter 510, an inverse quantizer 600, a prediction decoder 530, a memory 540, and a prediction executioner 550. The predictor 220B, unlike the predictor 220A of FIG. 5, does not include a bit shifter. The operation of the predictor 220B will now be described in detail with reference to FIG. 14, which is a flowchart illustrating an intraframe prediction encoding method.

Figure 14:
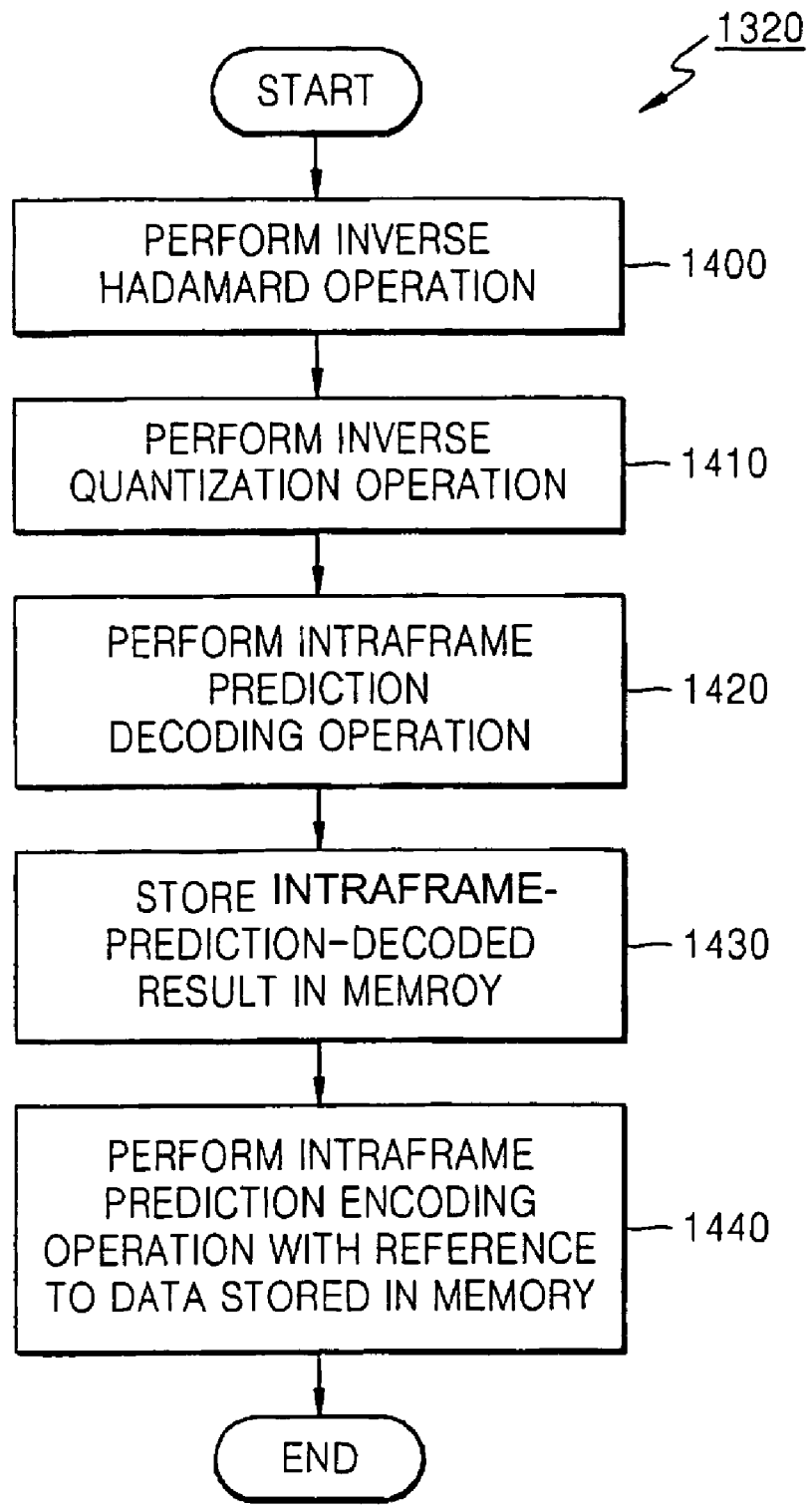
FIG. 14 is a detailed flowchart illustrating operation 1320 of FIG. 13.

Referring to FIGS. 6 and 14, in operation 1400, the inverse Hadamard converter 510 performs an inverse Hadamard conversion operation on the quantized 8×1 block data received from the quantizer 240 of FIG. 2. In operation 1410, the inverse quantizer 600 performs an inverse quantization operation on the inversely Hadamard-converted data to obtain data having as many bits as data obtained through an intraframe prediction encoding operation to be performed by the prediction executioner 550. Thus, the predictor 220B does not need to include a bit shifter.

In operation 1420, the prediction decoder 530 restores data yet to be intraframe-prediction-encoded from the inversely quantized data by performing a prediction decoding operation, which is an inverse operation of the intraframe prediction encoding operation to be performed by the prediction executioner 550, on the inversely quantized data. In operation 1430, the prediction decoder 530 stores the restored data in the memory 540.

In operation 1440, the prediction executioner 550 performs an intraframe prediction encoding operation on the YCoCg data received from the first color converter 210 using the data stored in the memory 540, which corresponds to a line adjacent to and above a line corresponding to the YCoCg data.

Figure 8:
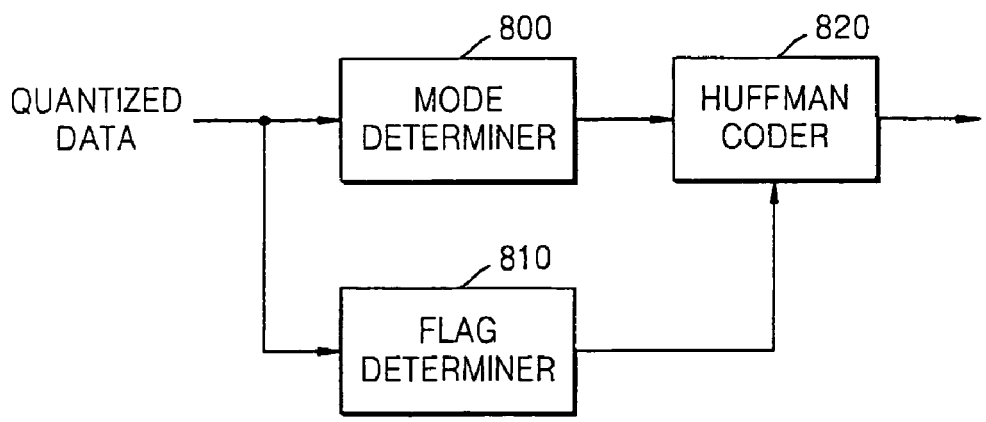
FIG. 8 is a detailed block diagram of a lossless encoder of FIG. 2.
Figure 9:
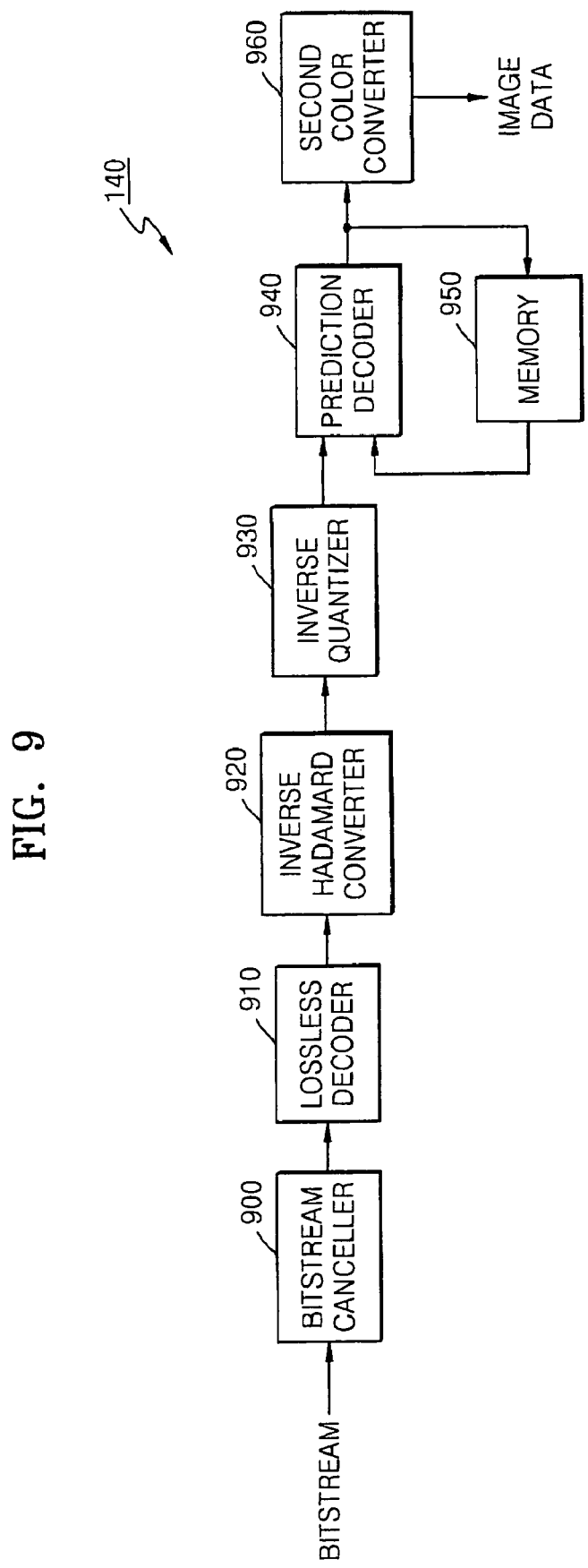
FIG. 9 is a detailed block diagram of a decoding unit of FIG. 1.

Referring back to FIG. 13, in operation 1350, the lossless encoder 250 performs a lossless encoding operation on the quantized 8×1 block data received from the quantizer 240. In operation 1350, the lossless encoder 250 may perform an entropy encoding operation on the quantized 8×1 block data. FIG. 8 is a detailed block diagram of an example of the lossless encoder 250 of FIG. 2. Referring to FIG. 8, the lossless encoder 250 includes a mode determiner 800, a flag determiner 810, and a Huffman coder 820.

The mode determiner 800 chooses one of three modes, i.e., Mode 0, Mode 1, and Mode 2, according to the locations of 0s in the quantized 8×1 block data. In detail, if all of the 8 pixel values of the quantized 8×1 block data are 0 as illustrated in FIG. 1A, the mode determiner 800 may choose Mode 0. If four consecutive pixel values on the far right of the quantized 8×1 block data are 0 as illustrated in FIG. 10B, the mode determiner 800 may choose Mode 1. If none of the 8 pixel values of the quantized 8×1 block data are 0 as illustrated in FIG. 10C, the mode determiner 800 may choose Mode 2.

The flag determiner 810 sets a flag for the quantized 8×1 block data to 0 or 1 according to whether all of the absolute values of the 8 pixel values of the quantized 8×1 block data exceed a predetermined value. In detail, if none of the absolute values of the 8 pixel values of the quantized 8×1 block data exceed 7, the flag determiner 810 may set the flag for the quantized 8×1 block data to 1. Otherwise, the flag determiner 810 may set the flag for the quantized 8×1 block to 0. The flag determiner 810 may be designed to set a flag value only for quantized 8×1 block data for which the mode determiner 800 has chosen Mode 1 or Mode 2.

For example, if the quantized 8×1 block data is as illustrated in FIG. 10D, the mode determiner 800 may choose Mode 1, and the flag determiner 810 may set the flag for the quantized 8×1 block data to 0. If the quantized 8×1 block data is as illustrated in FIG. 10E, the mode determiner 800 may choose Mode 2, and the flag determiner 810 may set the flag for quantized 8×1 block data to 1. If the quantized 8×1 block data is as illustrated in FIG. 10F, the mode determiner 800 may choose Mode 1, and the flag determiner 810 may set the flag for quantized 8×1 block data to 1.

The Huffman coder 820 entropy-encodes the mode and the flag value determined for the quantized 8×1 block data by the mode determiner 800 and the flag determiner 810, respectively. Table 1 presents entropy-encoding results obtained by entropy-encoding various mode values and the respective flag values.

TABLE 1

| Mode | Flag | Entropy-Encoding Result |
|---|---|---|
| 0 | — | 10 |
| 1 | 0 | 1111 |
|   | 1 | 110 |
| 2 | 0 | 1110 |
|   | 1 | 0 |

The Huffman coder 820 entropy-encodes the pixel values of the quantized 8×1 block data, each including a data level and a sign. Table 2 presents entropy-encoding results obtained by entropy-encoding various data levels and the respective signs.

TABLE 2

| | Level | | | | | | |
|---|---|---|---|---|---|---|---|
| | DC | | AC | | | | |
| | 0 | 1 | 0 | 1 | 2 | 3 | 4, 5, 6, ... |
| Entropy-Encoding Result | 10 | 0 | 0 | 10 | 1110 | 1111 | 110 XXXXXXX (if flag = 0) 110 XXX (if flag = 1) |

In Table 2, a DC block having a data level of 0 or 1 is differentiated from an AC block having a data level of 0 or 1 because the probability of a DC block having a data level of 1 is higher than the probability of the DC block having a data level of 0 and the probability of an AC block having a data level of 1 is lower than the probability of the AC block having a data level of 0. In addition, as indicated in Table 2, if the flag of the quantized 8×1 block data is set to 0, a data level not less than 4 may be entropy-encoded as a 10-bit binary value beginning with '110'. If the flag of the quantized 8×1 block data is set to 0, a data level not smaller than 4 may be entropy-encoded as a 6-bit binary value beginning with '110'.

The Huffman coder 820 may entropy-encode the sign of a negative pixel value of the quantized 8×1 block data as a value of 1 and may entropy-encode the sign of a positive pixel level of the quantized 8×1 block data as a value of 0.

For example, if the quantized 8×1 block data is as illustrated in FIG. 11A, its flag may be set to 0 because it includes a pixel value whose absolute value exceeds 7. Thus, as indicated in Table 2, a data level of the quantized 8×1 block data which is not smaller than 4 is entropy-encoded as a 10-bit binary value beginning with '110'. Therefore, a pixel value of +8 is entropy-encoded as '110 000 1000 0' in which '110 000 1000' is a 10-bit binary value equivalent to a data level of 8, and '0' following '110 000 1000' corresponds to the sign of the corresponding pixel value, i.e., (+); a pixel level of −4 is entropy-encoded as '110 000 0100 1' in which '110 000 0100' is a 10-bit binary value equivalent to a data level of 4, and '1' following '110 000 0100' corresponds to the sign of the corresponding pixel value, i.e., (−); a pixel value of −3 is entropy-encoded as '11111' in which '1111' corresponds to a data level of the corresponding pixel value, i.e., 3, and '1' following '1111' corresponds to the sign of the corresponding pixel value, i.e., (−); and a pixel value of 2 is entropy-encoded as '1110 0' in which '1110' corresponds to a data value of the corresponding pixel value, i.e., 2, and '0' following '1110' corresponds to the sign of the corresponding pixel value, i.e., (+).

For example, if the quantized 8×1 block data is as illustrated in FIG. 11B, its flag may be set to 1 because the absolute values of none of the pixel values of the quantized 8×1 block data exceed 7. Thus, as indicated in Table 2, a data level of the quantized 8×1 block data which is less than 4 is entropy-encoded as a 6-bit binary value beginning with '110'. Therefore, a pixel value of 6 is entropy-encoded as '110 110 0' in which '110 110' is a 6-bit binary value equivalent to a data level of 6, and '0' following '110 110' corresponds to the sign of the corresponding pixel value, i.e., (+); a pixel level of −4 is entropy-encoded as '110 100 1' in which '110 100' is a 6-bit binary value equivalent to a data level of 4, and '1' following '110 100' corresponds to the sign of the corresponding pixel value, i.e., (−); a pixel value of −3 is entropy-encoded as '1111 1' in which '1111' corresponds to a data level of the corresponding pixel value, i.e., 3, and '1' following '1111' corresponds to the sign of the corresponding pixel value, i.e., (−); and a pixel value of 2 is entropy-encoded as '1110 0' in which '1110' corresponds to a data value of the corresponding pixel value, i.e., 2, and '0' following '1110' corresponds to the sign of the corresponding pixel value, i.e., (+).

Referring back to FIG. 13, in operation 1360, the size adjuster 260 determines whether the number of bits allocated for quantization needs to be adjusted by comparing the size of the losslessly encoded data obtained in operation 1350 with a maximum data size Bits_max determined in advance in consideration of the size of the memory 130. In operation 1370, if the number of bits allocated for quantization is determined to require adjustment in operation 1360, the size adjuster 260 adjusts the number of bits allocated for quantization, and then the method returns to operation 1340. In operation 1380, if the number of bits allocated for quantization is determined as not needing adjustment in operation 1360, the bitstream generator 270 generates a bitstream based on the losslessly encoded data and encoding information regarding the losslessly encoded data.

Figure 15:
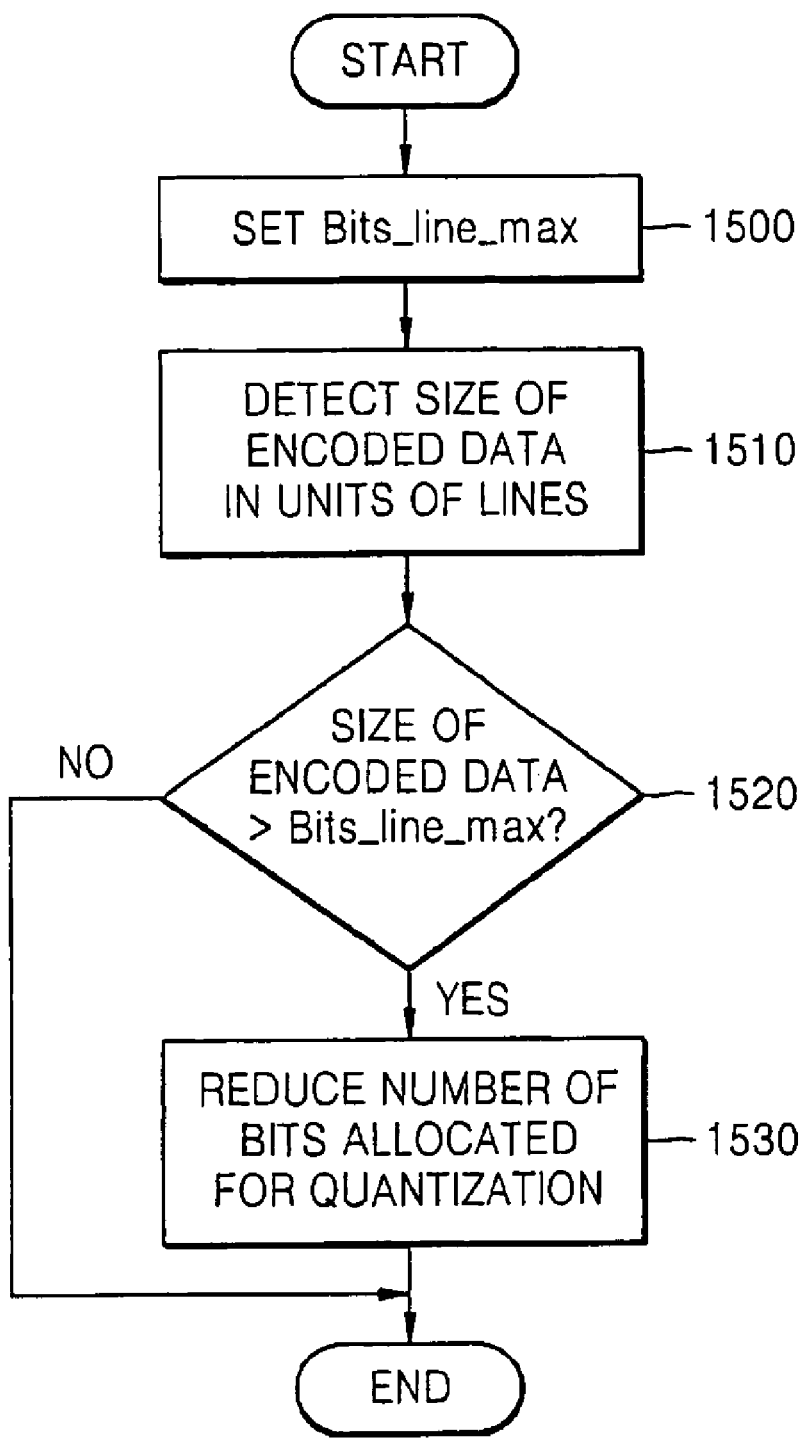
FIG. 15 is a flowchart illustrating a method of adjusting the number of bits allocated for quantization based on the size of encoded data.

FIG. 15 is a flowchart illustrating a method of adjusting the number of bits allocated for quantization performed by the size adjuster 260 of FIG. 2. Referring to FIG. 15, in operation 1500, the size adjuster 260 sets a maximum number of bits that can be possessed by encoded single line data, i.e., a maximum bit number Bits_line_max, according to the size of the memory 130. For example, in QVGA resolution, an image to be displayed consists of 240 lines. Thus, assuming that the memory 130 can store up to 24,000 bits, a maximum number of bits that can be possessed by each of the 240 lines, i.e., the maximum bit number Bits_line_max, may be set to 100.

In operation 1510, the size adjuster 260 detects the size of encoded single line data. In operation 1520, the size adjuster 260 compares the detected data size with the maximum bit number Bits_line_max. In operation 1530, if the detected data size is greater than the maximum bit number Bits_line_max, the size adjuster 260 reduces the number of bits allocated for quantization. On the other hand, if the detected data size is less than the maximum bit number Bits_line_max, the size adjuster 260 may increase the number of bits allocated for quantization. If the size of data currently stored in the memory 130 is less than a predefined minimum data size memory_lower_limit, the size adjuster 260 may adjust the number of bits allocated for quantization to be equal to a predefined maximum value extra_max_bitdepth.

FIG. 11 is a detailed block diagram of the decoding unit of FIG. 1. Referring to FIG. 11, the decoding unit 140 includes a bitstream canceller 900, a lossless decoder 910, an inverse Hadamard converter 920, an inverse quantizer 930, a prediction encoder 940, and a second color converter. The operation of the decoding unit 140 will now be described in detail with reference to FIG. 16, which is a detailed flowchart illustrating operation 1230 of FIG. 12.

Figure 16:
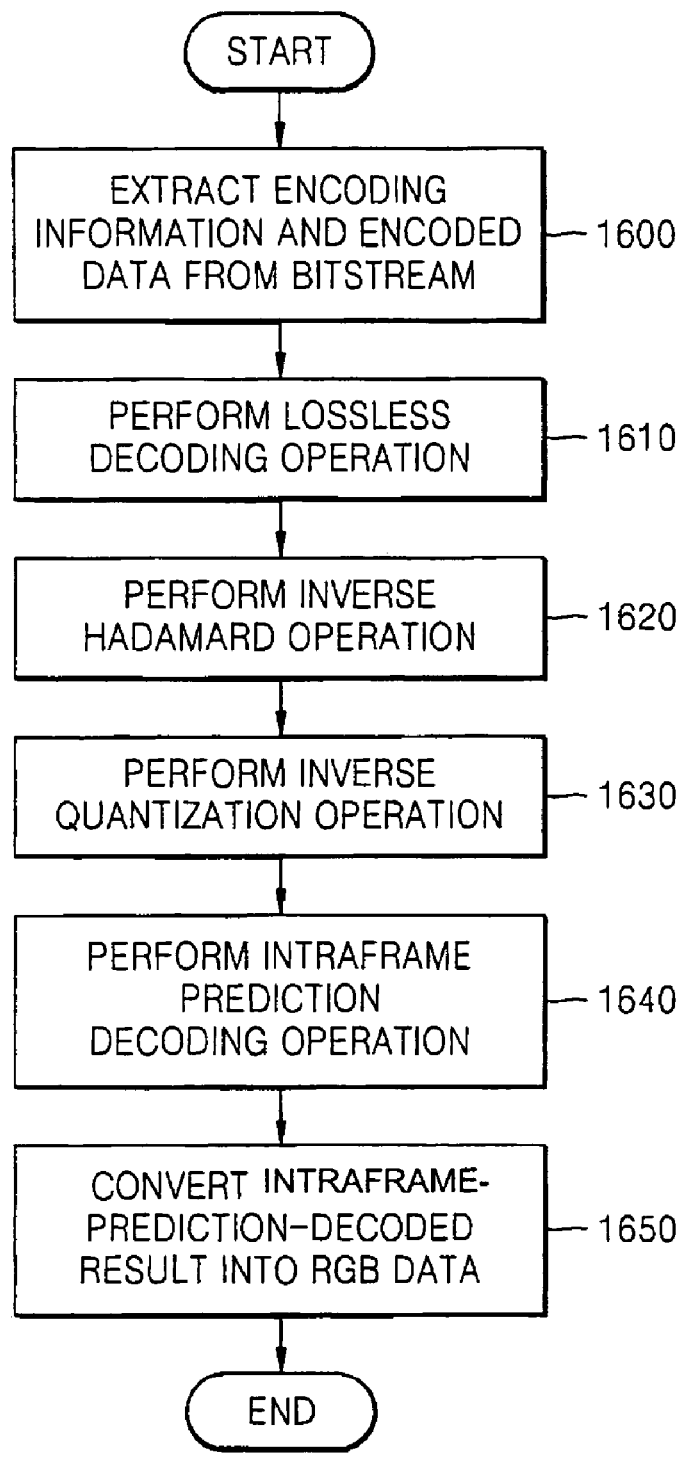
FIG. 16 is a detailed flowchart illustrating operation 1230 of FIG. 12.

Referring to FIGS. 11 and 16, in operation 1600, the bitstream canceller 900 cancels a bitstream read out from the memory 130 by the memory controller 120 and extracts encoded data and various encoding information needed for decoding the encoded data from the cancelled bitstream.

In operation 1610, the lossless decoder 910 performs a lossless decoding operation, which is an inverse operation of the lossless encoding operation performed by the lossless encoder 250, on the encoded data extracted in operation 1600. In operation 1620, the inverse Hadamard converter 920 performs an inverse Hadamard conversion operation on the losslessly decoded data. In operation 1630, the inverse quantizer 930 performs an inverse quantization operation on the inversely Hadamard-converted data using a number of bits allocated for quantization included in the encoding information extracted in operation 1600. In the present exemplary embodiment, as described above with reference to FIG. 6, the inverse Hadamard conversion operation and the inverse quantization operation are sequentially performed instead of performing the inverse quantization operation and then the inverse Hadamard conversion operation. Thus, in the present exemplary embodiment, there is no need to perform a bit shifting operation.

In operation 1640, the prediction decoder 940 performs an intraframe prediction decoding operation on the inversely quantized data. The intraframe-prediction-decoded data is stored in the memory 950 in units of lines, and the prediction decoder 940 performs an intraframe prediction decoding operation on the inversely quantized data with reference to the data stored in the memory 950.

In operation 1650, the second color converter 960 converts the intraframe-prediction-decoded data into RGB data that can be displayed by the display device 150.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded in/on a non-transitory medium in a variety of ways, with examples of the non-transitory medium including magnetic storage media (e.g., ROM, floppy disks, hard disks, etc.), optical recording media (e.g., CD-ROMs, or DVDs), and random access memory media. The non-transitory medium may also be a distributed network, so that the computer readable code/instructions is/are stored and executed in a distributed fashion. The computer readable code/instructions may be executed by one or more processors.

As described above, in the present invention, input image data is compressed and encoded in units of blocks, and the encoded image data is stored in a memory. Thereafter, the encoded image data stored in the memory is decoded, and the decoded result is output to a display device. Thus, it is possible to reduce the size of a memory included in a display driving apparatus without deteriorating the quality of an image displayed.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A display driving apparatus which drives a display device for displaying images, the display driving apparatus comprising:
- an encoding unit which compresses and encodes image data to be displayed by the display device in units of lines;
- a memory which stores the encoded image data;
- a memory control unit which stores the encoded image data in the memory and reads the encoded image data from the memory; and
- a decoding unit which decodes the encoded image data read out from the memory to restore the image data,
- wherein the encoding unit sequentially converts the lines of the image data into a plurality of blocks according to a receiving sequence of the image data.

2. The display driving apparatus of claim 1, wherein the encoding unit encodes the image data in units of lines.

3. The display driving apparatus of claim 2, wherein the encoding unit encodes the image data in units of 8×1 blocks.

4. The display driving apparatus of claim 1, wherein the encoding unit encodes the image data so that the image data can be compressed to be no larger than a predetermined size.

5. The display driving apparatus of claim 4, wherein the encoding unit comprises:
- a quantizer which performs a quantization operation on the image data using a number of bits allocated for quantization; and
- a size adjuster which reduces the number of bits allocated for quantization if the size of the encoded image data is larger than the predetermined size.

6. The display driving apparatus of claim 5, wherein the size adjuster increases the number of bits allocated for quantization if the size of the encoded image data is smaller than the predetermined size.

7. The display driving apparatus of claim 5, wherein the size adjuster compares the size of the encoded image data with the predetermined size in units of lines of an image that can be displayed by the display device and adjusts the number of bits allocated for quantization based on the comparison results.

8. The display driving apparatus of claim 1, wherein the encoding unit comprises a Hadamard converter which performs a Hadamard conversion operation on the image data.

9. A display driving apparatus which drives a display device for displaying images, the display driving apparatus comprising:
- an encoding unit which encodes image data to be displayed by the display device in units of lines so that the image data can be compressed to be no larger than a predetermined size;
- a memory which stores the encoded image data;
- a memory control unit which stores the encoded image data in the memory and reads the encoded image data from the memory; and
- a decoding unit which decodes the encoded image data read out from the memory to restore the image data,
- wherein the encoding unit sequentially converts the lines of the image data into a plurality of blocks according to a receiving sequence of the image data.

10. The display driving apparatus of claim 9, wherein the encoding unit comprises:
- a first color converter which color-converts RGB data to be displayed by the display device in units of 8×1 blocks in order to remove color redundancy from the RGB data;
- a predictor which performs an intraframe prediction encoding operation on the color-converted data;
- a Hadamard converter which performs a Hadamard conversion operation on the intraframe-prediction-encoded data;
- a quantizer which performs a quantization operation on the Hadamard-converted data using a number of bits allocated for quantization;
- a lossless encoder which performs a lossless encoding operation on the quantized data; and
- a size adjuster which reduces the number of bits allocated for quantization if the size of the losslessly encoded image data is larger than the predetermined size.

11. The display driving apparatus of claim 10, wherein the first color converter color-converts the RGB data into YCoCg data.

12. The display driving apparatus of claim 10, wherein the predictor performs the intraframe prediction encoding operation on the color-converted data in a vertical direction.

13. The display driving apparatus of claim 10, wherein the predictor performs the intraframe prediction encoding operation on the color-converted data in a vertical direction, a leftward diagonal line direction, and a rightward diagonal direction and chooses one of the intraframe-prediction-encoded results.

14. The display driving apparatus of claim 10, wherein the predictor comprises:
- an inverse Hadamard converter which performs an inverse Hadamard conversion operation on the quantized data;
- an inverse quantizer which performs an inverse quantization operation on the inversely Hadamard-converted data;
- a prediction decoder which performs an intraframe prediction decoding operation on the inversely quantized data;
- a prediction memory which stores the intraframe-prediction-decoded data in units of lines; and
- a prediction executioner which performs an intraframe prediction encoding operation on the color-converted data using the data stored in the prediction memory.

15. The display driving apparatus of claim 10, wherein the quantizer performs a quantization operation on the Hadamard-converted data using a dead zone approach.

16. The display driving apparatus of claim 10, wherein the lossless encoder comprises:
- a mode determiner which chooses Mode 0 if all of a plurality of pixel values of quantized 8×1 block data are 0, chooses Mode 1 if only the last 4 pixel values of the quantized 8×1 block data are 0, and chooses Mode 2 if none of the pixel values of the quantized 8×1 block data are 0;
- a flag determiner which sets a flag for the quantized 8×1 block data to a value of 1 if all of the pixel values of the quantized 8×1 block data have an absolute value of 7 or less and sets the flag for the quantized 8×1 block data to a value of 0 otherwise; and
- a Huffman coder which performs a Huffman coding operation on the quantized 8×1 block data using the mode determined by the mode determiner and the flag value determined by the flag determiner.

17. The display driving apparatus of claim 10, wherein the size adjuster increases the number of bits allocated for quantization if the size of the losslessly encoded image data is less than the predetermined size.

18. The display driving apparatus of claim 10, wherein, if the size adjuster changes the number of bits allocated for quantization, the quantizer performs a quantization operation on the Hadamard-converted data using the changed number of bits allocated for quantization.

19. The display driving apparatus of claim 9, wherein the decoder comprises:
   a lossless decoder which performs a lossless decoding operation on the encoded image data read out from the memory;
   an inverse Hadamard converter which performs an inverse Hadamard conversion operation on the losslessly decoded data;
   an inverse quantizer which performs an inverse quantization operation on the inversely Hadamard-converted data;
   a prediction decoder which performs an intraframe prediction decoding operation on the inversely quantized data; and
   a second color converter which color-converts the intraframe-prediction-decoded data into RGB data.

20. A display driving method of driving a display device for displaying images, the display driving method comprising:
   compressing and encoding image data to be displayed by the display device in units of lines;
   storing the encoded image data in a memory; and
   reading the encoded image data from the memory and decoding the encoded image data read out from the memory to restore the image data,
   wherein the encoding unit sequentially converts the lines of the image data into a plurality of blocks according to a receiving sequence of the image data.

21. The display driving method of claim 20, wherein the encoding comprises encoding the image data in units of lines.

22. The display driving method of claim 20, wherein the encoding comprises encoding the image data in units of 8×1 blocks.

23. The display driving method of claim 20, wherein the encoding comprises encoding the image data so that the image data can be compressed to be no larger than a predetermined size.

24. The display driving method of claim 23, wherein the encoding comprises:
   performing a quantization operation on the image data using a number of bits allocated for quantization; and
   reducing the number of bits allocated for quantization if the size of the encoded image data is larger than the predetermined size.

25. The display driving method of claim 23, wherein the encoding comprises:
   performing a quantization operation on the image data using the number of bits allocated for quantization; and
   increasing the number of bits allocated for quantization if the size of the encoded image data is smaller than the predetermined size and performing the quantization operation again on the image data using the increased number of bits allocated for quantization.

26. The display driving method of claim 24, further comprising comparing the size of the encoded image data with the predetermined size in units of lines of an image that can be displayed by the display device and adjusting the number of bits allocated for quantization based on the comparison results.

27. The display driving method of claim 20, wherein the encoding comprises performing a Hadamard conversion operation on the image data.

28. A display driving method of driving a display device for displaying images, the display driving method comprising:
   encoding image data to be displayed by the display device in units of lines so that the image data can be compressed to be no larger than a predetermined size;
   storing the encoded image data in a memory; and
   reading the encoded image data from the memory and decoding the encoded image data read out from the memory to restore the image data,
   wherein the encoding unit sequentially converts the lines of the image data into a plurality of blocks according to a receiving sequence of the image data.

29. The display driving method of claim 28, wherein the encoding comprises:
   color-converting RGB data to be displayed by the display device in units of 8×1 blocks in order to remove color redundancy from the RGB data;
   performing an intraframe prediction encoding operation on the color-converted data;
   performing a Hadamard conversion operation on the intraframe-prediction-encoded data;
   performing a quantization operation on the Hadamard-converted data using a number of bits allocated for quantization;
   performing a lossless encoding operation on the quantized data; and
   reducing the number of bits allocated for quantization if the size of the losslessly encoded image data is larger than the predetermined size and performing the quantization operation and the lossless encoding operation again using the reduced number of bits allocated for quantization.

30. The display driving method of claim 29, wherein the color-converting comprises color-converting the RGB data into YCoCg data.

31. The display driving method of claim 29, wherein the performing of the intraframe prediction encoding operation comprises performing the intraframe prediction encoding operation on the color-converted data in a vertical direction.

32. The display driving method of claim 29, wherein the performing of the intraframe prediction encoding operation comprises: performing the intraframe prediction encoding operation on the color-converted data in a vertical direction, a leftward diagonal line direction, and a rightward diagonal line direction; and
   choosing the intraframe-prediction-encoded result that minimizes spatial redundancy.

33. The display driving method of claim 29, wherein the performing of the intraframe prediction encoding operation comprises:
   performing an inverse Hadamard conversion operation on the quantized data;
   performing an inverse quantization operation on the inversely Hadamard-converted data;
   performing an intraframe prediction decoding operation on the inversely quantized data;
   storing the intraframe-prediction-decoded data in a memory in units of lines; and
   performing an intraframe prediction encoding operation on the color-converted data using the data stored in the memory.

34. The display driving method of claim 29, wherein the performing of the quantization operation comprises performing the quantization operation on the Hadamard-converted data using a dead zone approach.

35. The display driving method of claim 29, wherein the performing of the lossless encoding operation comprises:
   choosing Mode 0 if all of a plurality of pixel values of quantized 8×1 block data are 0, choosing Mode 1 if only the last 4 pixel values of the quantized 8×1 block data are 0, and choosing Mode 2 if none of the pixel values of the quantized 8×1 block data are 0;

setting a flag for the quantized 8×1 block data to a value of 1 if all of the pixel values of the quantized 8×1 block data have an absolute value of 7 or less and setting the flag for the quantized 8×1 block data to a value of 0 otherwise; and performing a Huffman coding operation on the quantized 8×1 block data using the mode determined by the determined mode and the determined flag value.

36. The display driving method of claim 28, wherein the decoding comprises:

performing a lossless decoding operation on the encoded image data read out from the memory;

performing an inverse Hadamard conversion operation on the losslessly decoded data;

performing an inverse quantization operation on the inversely Hadamard-converted data;

performing an intraframe prediction decoding operation on the inversely quantized data; and color-converting the intraframe-prediction-decoded data into RGB data.

37. The display driving apparatus of claim 6, wherein the size adjuster compares the size of the encoded image data with the predetermined size in units of lines of an image that can be displayed by the display device and adjusts the number of bits allocated for quantization based on the comparison results.

38. The display driving apparatus of claim 17, wherein, if the size adjuster changes the number of bits allocated for quantization, the quantizer performs a quantization operation on the Hadamard-converted data using the changed number of bits allocated for quantization.

39. The display driving method of claim 25 further comprising comparing the size of the encoded image data with the predetermined size in units of lines of an image that can be displayed by the display device and adjusting the number of bits allocated for quantization based on the comparison results.

40. At least one non-transitory computer readable medium storing instructions that control at least one processor to perform a display driving method of driving a display device for displaying images, the display driving method comprising:

compressing and encoding image data to be displayed by the display device in units of lines;

storing the encoded image data in a memory; and reading the encoded image data from the memory and decoding the encoded image data read out from the memory to restore the image data, wherein the encoding unit sequentially converts the lines of the image data into a plurality of blocks according to a receiving sequence of the image data.

41. At least one non-transitory computer readable medium storing instructions that control at least one processor to perform a display driving method of driving a display device for displaying images, the display driving method comprising:

encoding image data to be displayed by the display device in units of lines so that the image data can be compressed to be no larger than a predetermined size;

storing the encoded image data in a memory; and reading the encoded image data from the memory and decoding the encoded image data read out from the memory to restore the image data, wherein the encoding unit sequentially converts the lines of the image data into a plurality of blocks according to a receiving sequence of the image data.

* * * * *